(12) United States Patent
Yoshida

(10) Patent No.: US 6,728,002 B1
(45) Date of Patent: Apr. 27, 2004

(54) INFORMATION RECORDING APPARATUS

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/454,968

(22) Filed: Dec. 6, 1999

(30) Foreign Application Priority Data

Dec. 8, 1998 (JP) .......................................... 10-348444

(51) Int. Cl.$^7$ .............................. G06F 3/12; G06K 15/02
(52) U.S. Cl. ..................... 358/1.18; 358/1.15; 358/452; 358/426.04
(58) Field of Search .............................. 358/1.18, 1.15, 358/452, 426.04; 399/17

(56) References Cited

U.S. PATENT DOCUMENTS

| | | | | |
|---|---|---|---|---|
| 4,870,501 A | | 9/1989 | Yoshida | 358/284 |
| 5,535,015 A | | 7/1996 | Yoshida | 358/438 |
| 5,600,429 A | * | 2/1997 | Kutsuwada | 399/17 |
| 5,627,650 A | * | 5/1997 | Nosaki et al. | 358/296 |
| 6,005,672 A | | 12/1999 | Yoshida | 358/434 |
| 6,336,011 B1 | * | 1/2002 | Sumio et al. | 399/82 |
| 6,406,199 B1 | * | 6/2002 | Hayashi | 400/76 |
| 2001/0013938 A1 | * | 8/2001 | Usami et al. | 358/1.9 |
| 2002/0159091 A1 | * | 10/2002 | Sakura | 358/1.15 |

* cited by examiner

*Primary Examiner*—Edward Coles
*Assistant Examiner*—Alan Rahimi
(74) *Attorney, Agent, or Firm*—Fitzpatrick, Cella, Harper & Scinto

(57) ABSTRACT

A binding position of recording sheets recorded with data on the front and back sides thereof and a rotation angle of data to be recorded are controlled to provide copies which are recorded with data on both sides in proper directions and are easy to be discriminated after the binding. If the binding position is set to the longer side of recording sheets, the data to be recorded on the back side is not rotated, whereas if the binding position is set to the shorter side of the recording sheet, the data to be recorded on the back side is rotated by 180°. If the binding position is not designated or if a dual-side original designation is given from a facsimile transmitter, the data to be recorded on the back side is not rotated.

2 Claims, 7 Drawing Sheets

FRONT SIDE

BACK SIDE

FRONT SIDE

BACK SIDE

FRONT SIDE

FIG. 2B

BACK SIDE

FIG. 3A

FRONT SIDE

FIG. 3B

BACK SIDE

FIG. 4A

FRONT SIDE

FIG. 4B

BACK SIDE

FIG. 4C

FRONT SIDE

FIG. 4D

BACK SIDE

FIG. 5A

FRONT SIDE

FIG. 5B

BACK SIDE

FIG. 5C

FRONT SIDE

FIG. 5D

BACK SIDE

INFORMATION RECORDING APPARATUS

BACKGROUND OF THE INVENTION

1. Field of the Invention

The present invention relates to an information recording apparatus capable of recording information to be visualized (hereinafter referred to as "visible data") on both sides of a recording sheet and rotating the visible data to be recorded on the back side of the sheet, the apparatus being suitable for application to apparatus such as a facsimile apparatus capable of transmitting data of a dual-side original.

2. Related Background Art

A conventional facsimile apparatus capable of transferring data of a dual-side original receives data of the dual-side original and records it without rotating the data of the back side.

Figure 2A:
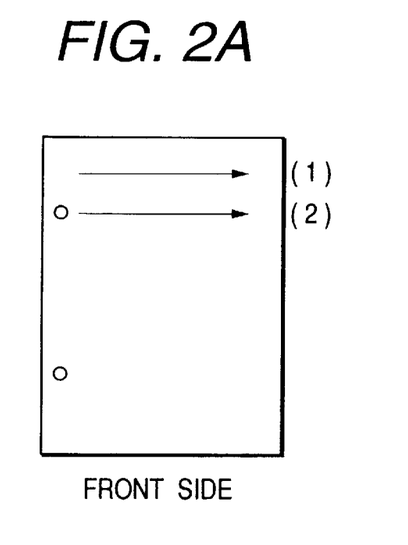
FIGS. 2A and 2B illustrate an example of a bound recording sheet, whose front and back sides are recorded with data by a conventional recording method.
Figure 2B:
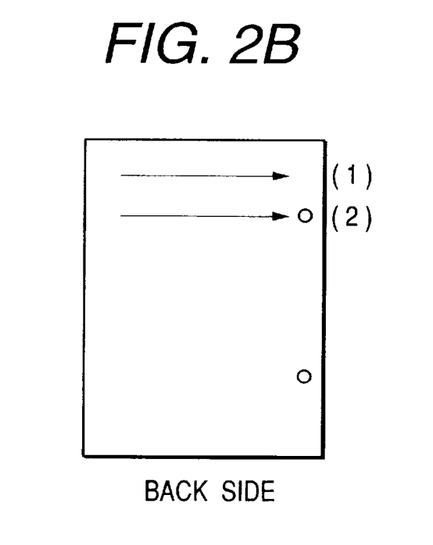

Specifically, as shown in FIG. 2A, data of the front side is recorded from the left end to right end left end to right end. Data of the back side is recorded from the right end to left end of the shorter side, and then at the next line from the right end to left end, as shown in FIG. 2B, by taking into consideration that the recording sheet is to be turned by 180°.

With a conventional information recording method described above, however, when each of recording sheets whose both sides are recorded with data is bound at the upper shorter side, data on the back side is turned upside down.

Figure 3A:
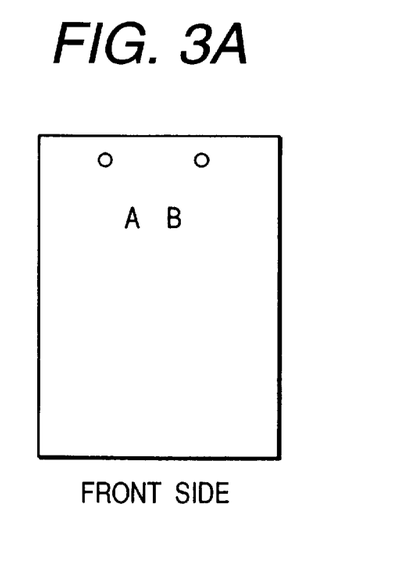
FIGS. 3A and 3B illustrate another example of a bound recording sheet, whose front and back sides are recorded with data by a conventional recording method.
Figure 3B:
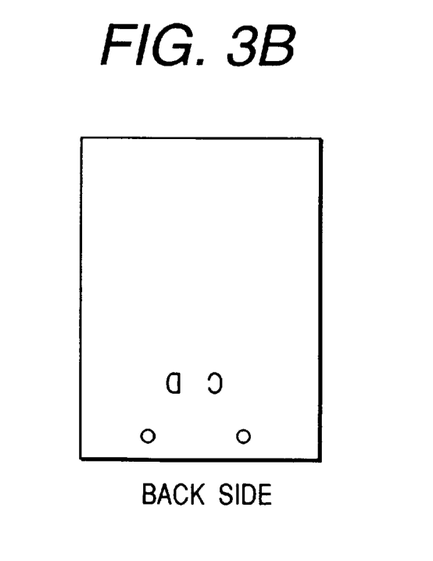
Figure 4A:
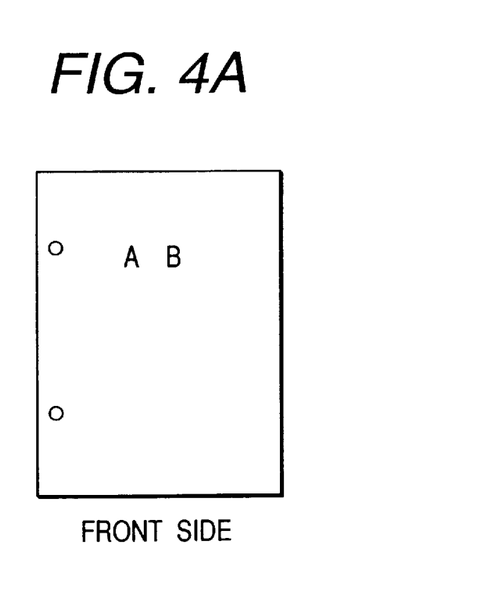
FIGS. 4A, 4B, 4C and 4D illustrate examples of bound recording sheets, whose front and back sides are recorded with data by an embodiment recording method.
Figure 4B:
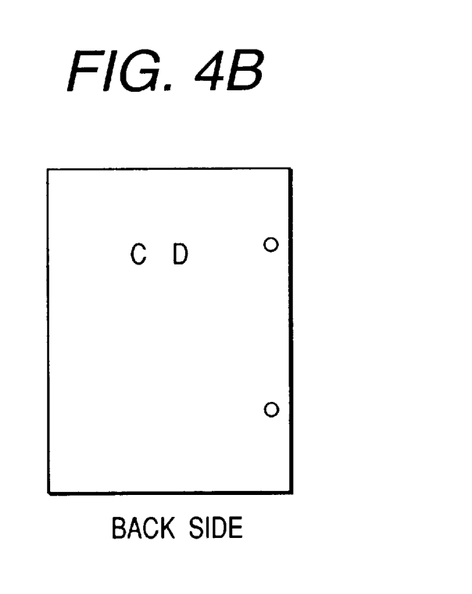
Figure 4C:
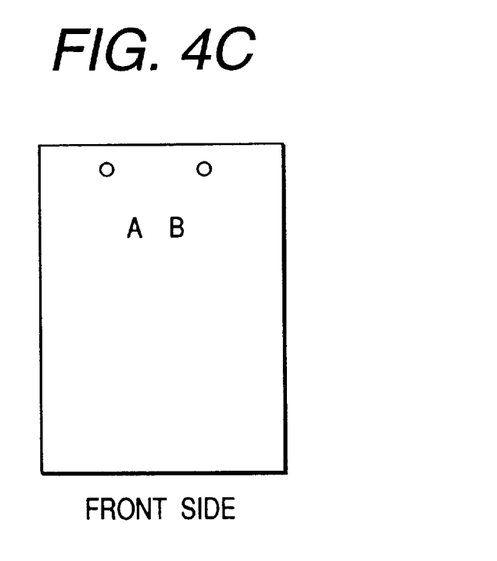
Figure 4D:
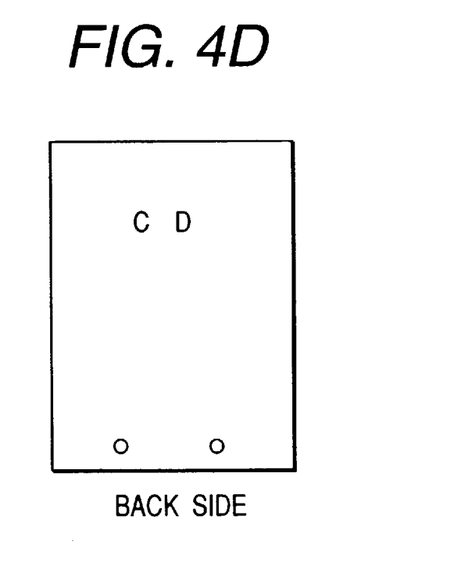
Figure 5A:
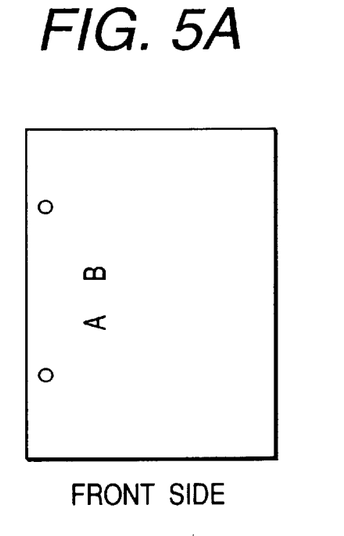
FIGS. 5A, 5B, 5C and 5D illustrate other examples of bound recording sheets, whose front and back sides are recorded with data by the embodiment recording method.
Figure 5B:
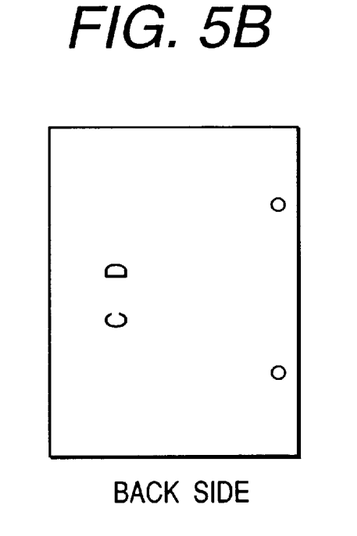
Figure 5C:
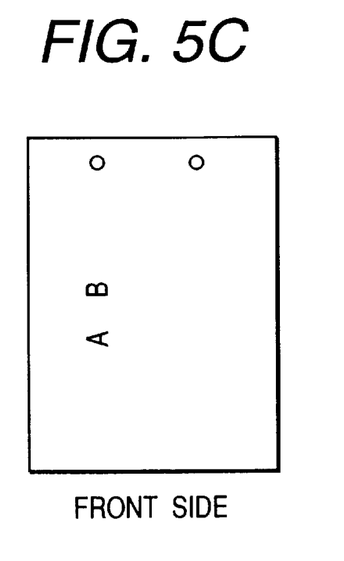
Figure 5D:
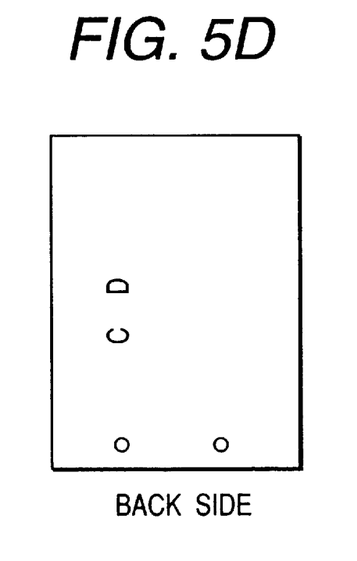

FIGS. 3A and 3B show an example of such a case. As shown in FIG. 3B, when each of recording sheets whose both sides are recorded with data is bound at the upper shorter side and it is turned by 180° about the shorter side, recorded characters are turned upside down.

SUMMARY OF THE INVENTION

It is an object of the invention to provide an information recording apparatus capable of recording information in correct directions on both the front and back sides of a recording sheet.

DETAILED DESCRIPTION OF THE PREFERRED EMBODIMENTS

Figure 1:
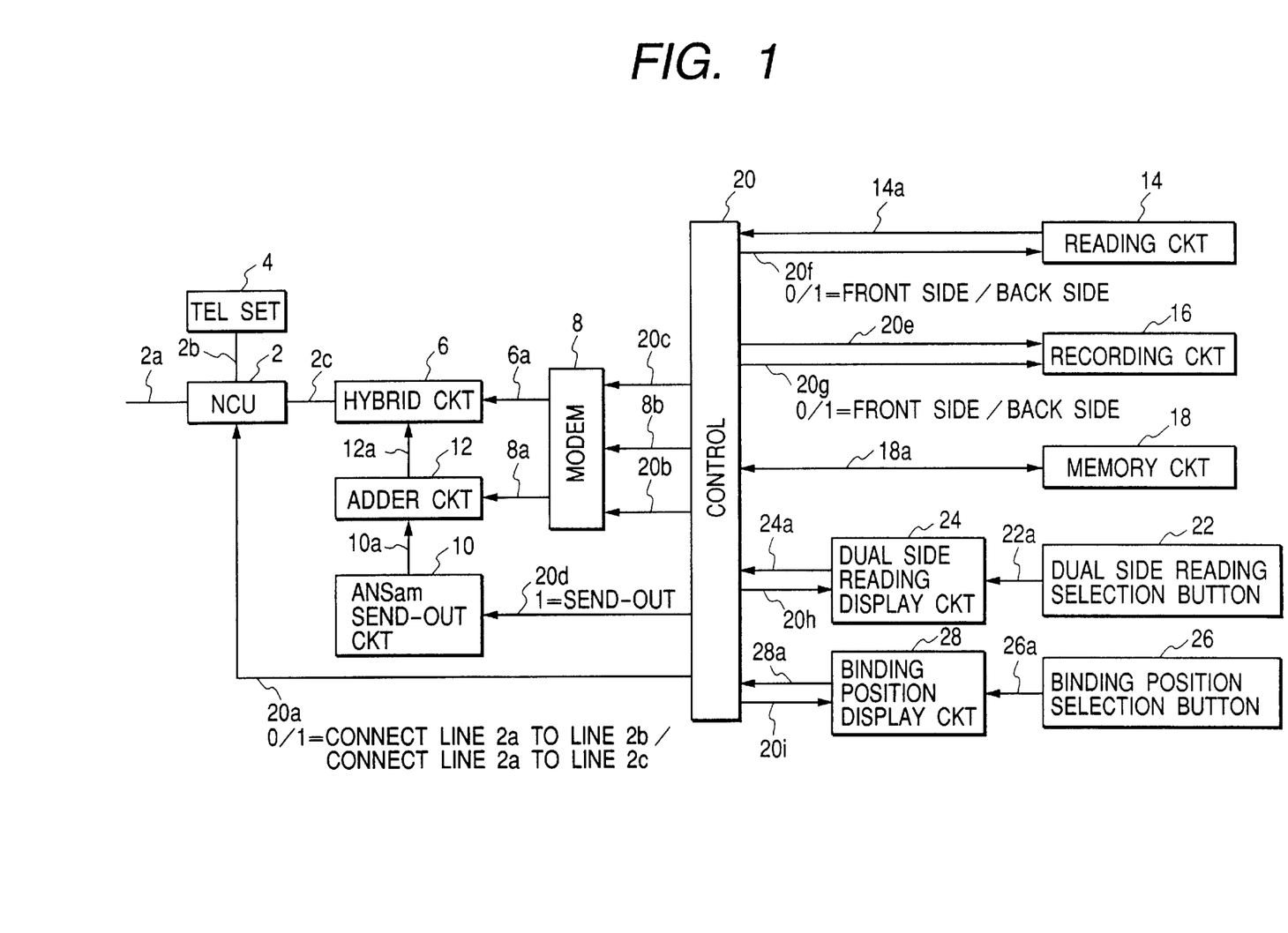
FIG. 1 is a block diagram showing the structure of a facsimile apparatus according to an embodiment of the invention.

FIG. 1 is a block diagram showing the structure of a facsimile apparatus according to an embodiment of the invention.

An NCU (network control unit) 2 is connected to a terminal connected to a line of a telephone network to perform connection control on the telephone switched network, perform switching to a data communication path, and maintain a loop, thereby using the telephone network for the data communication and the like. The NCU 2 connects a telephone line 2a to a telephone set 4 if a signal level on a signal line 20a is "0", whereas it connects the telephone line 2a to a facsimile apparatus if the signal level is "1". In an ordinary state, the telephone line 2a is connected to the telephone set 4.

A hybrid circuit 6 separates signals for the transmission system from signals for the reception system, sends a transmission signal supplied from an adder circuit 12 to the telephone line 2a via the NCU 2, and receives a reception signal from a partner via the NCU 2 and sends it via a signal line 6a to a modem 8.

The modem 8 carries out modulation and demodulation conforming to ITU-T Recommendations V. 8, V. 21, V.27 ter, V. 29, V. 17 and V. 34, and each transmission mode is designated by a signal on a signal line 20c. The modem 8 receives a signal on a signal line 20b to output modulated data to a signal line 8a, and receives a signal on the signal line 6a to output demodulated data to a signal line 8b.

An ANSam send-out circuit 10 sends out an ANSam signal to a signal line 10a when a signal having a level "1" is output to a signal line 20d, and does not output any signal to the signal line 10a when a signal having a level "0" is output to the signal line 20d.

The adder circuit 12 receives data on the signal line 8a and data on the signal line 10a, and adds them together to output a result to a signal line 12a.

A reading circuit 14 reads an original and outputs read data to a signal line 14a. This reading circuit 14 reads the front side of an original when a signal having the level "0" is output to a signal line 20f, and reads the back side of the original when a signal having the level "1" is output to the signal line 20f.

A recording circuit 16 sequentially records data on a signal line 20e one line after another. The recording circuit 16 records data on the front side of a recording sheet when a signal having the level "0" is output to a signal line 20g, and records data on the back side of the recording sheet when a signal having the level "1" is output to the signal line 20g.

A memory circuit 18 stores raw read data, encoded data, received data, decoded data and the like.

A dual-side reading selection button 22 is depressed when a dual-side read is to be selected. When this button 22 is depressed, a depression pulse is output to a signal line 22a.

A dual-side reading display circuit 24 is a circuit to be used for giving an indication to the effect that a dual-side read is selected. When a clear pulse is output to a signal line 20h, "no indication" is given. Thereafter, each time the depression signal is output to the signal line 22a, "indication"→"no indication"→"indication" are sequentially repeated. While the display circuit 24 gives an indication, it outputs a signal having the level "0" to the signal line 24a.

A binding position selection button 26 is depressed when a binding position of a recording sheet to be recorded with received data is to be selected. When this button 26 is depressed, a depression pulse is output to a signal line 26a.

A binding position display circuit 28 is a circuit used for displaying a selected binding position. When a clear pulse is output to the signal line 20i, an indication "binding position is not designated" is displayed. Thereafter, each time the depression pulse is output to the signal line 26a, indications "binding at longer side of recording sheet"→"binding at shorter side of recording sheet"→"binding position is not designated" are sequentially displayed. While the indication "binding position is not designated" is displayed, a signal "0" is output to the signal line 28a. While the indication "binding at longer side of recording sheet" is displayed, a signal "1" is output to the signal line 28a. While the indication "binding at shorter side of recording sheet" is displayed, a signal "2" is output to the signal line 28a.

A control circuit 20 controls the whole of the facsimile apparatus of this embodiment. Particularly in this embodiment, when received data is used for the dual-side recording, received data to be recorded on the back side of a recording sheet is rotated by a predetermined angle relative to received data to be recorded on the front side thereof, in accordance with the designated binding position.

Specifically, the facsimile apparatus of this embodiment has a binding mechanism (not shown) for binding recording sheets with recorded data when they are ejected. This binding mechanism has a function of selecting whether recording sheets are bound at the left longer side or at the upper shorter side of them, in accordance with a selection by the binding position selection button 26.

Also the facsimile apparatus of this embodiment has a function of recording received data by rotating it by a desired angle. Particularly in this embodiment, the facsimile apparatus has a function that when received data is used for the dual-side recording, received data to be recorded on the back side of a recording sheet is rotated by a predetermined angle relative to received data to be recorded on the front side thereof.

The control circuit 20 controls the binding position of recording sheets and the rotation of received data when the dual-side recording is used. More specifically, if binding at the longer side of recording sheets is designated, received data to be recorded on the back side of recording sheets is not rotated. On the other hand, if binding at the shorter side of recording sheets is designated, received data to be recorded on the back side of recording sheets is rotated by 180°. If the binding position ,is not designated or if the transmission side designates a dual-side original, received data to be recorded on the back side of recording sheets is not rotated.

Figure 6:
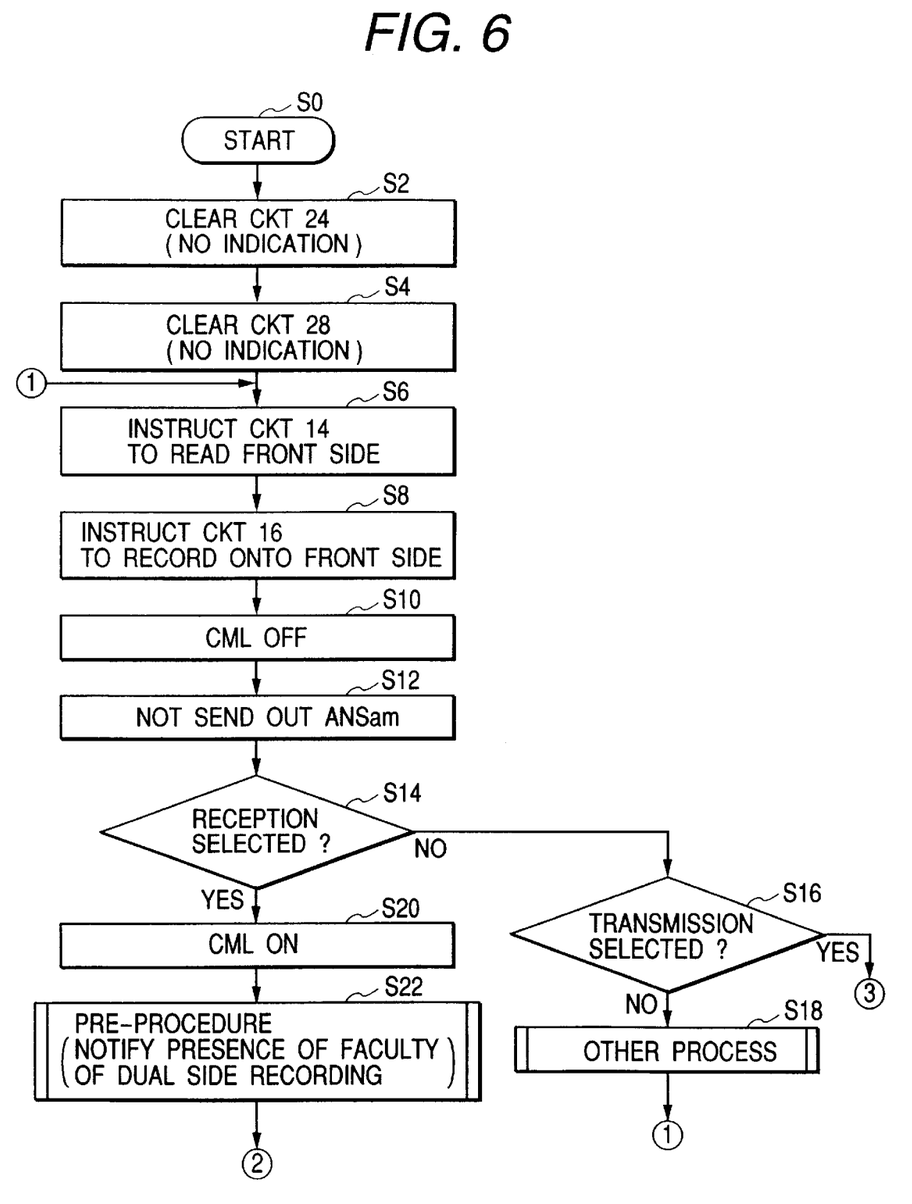
FIG. 6 is a flow chart illustrating the operation to be executed by the facsimile apparatus of the embodiment.
Figure 7:
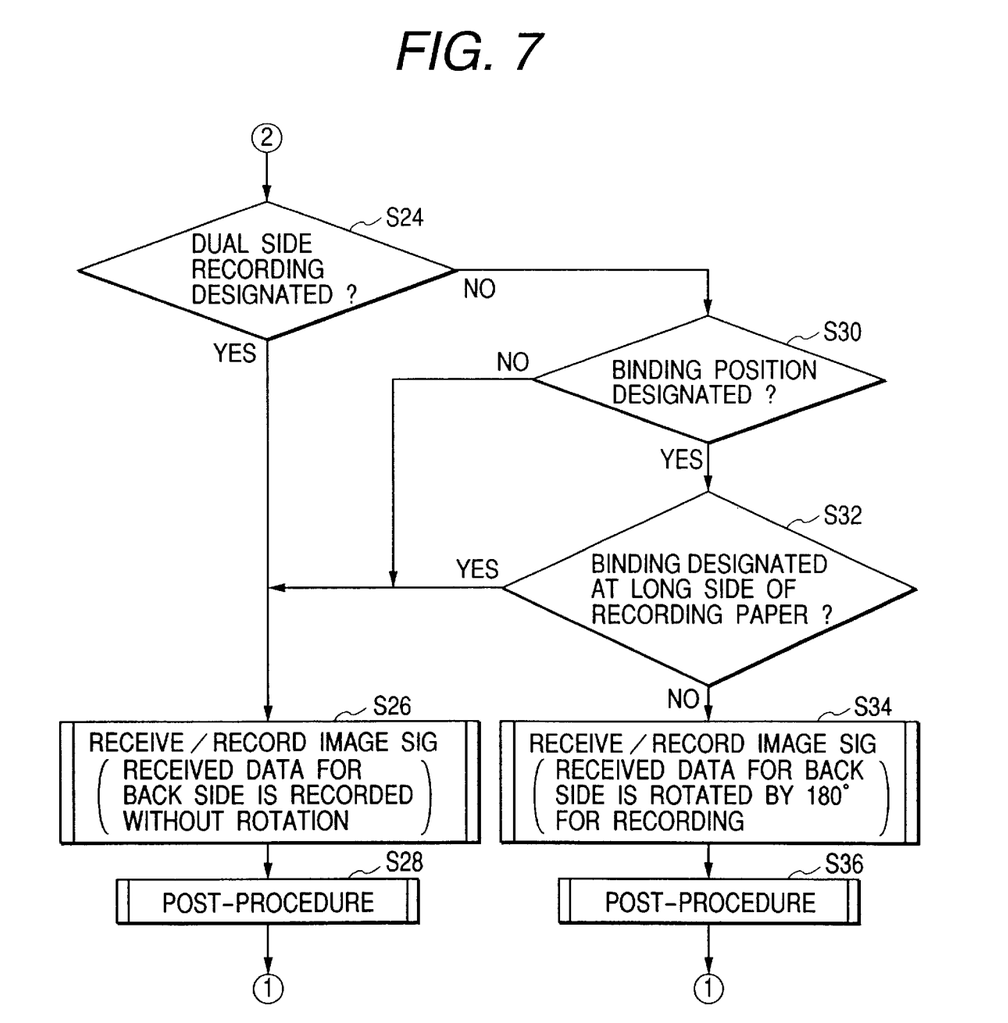
FIG. 7 is a flow chart illustrating the operation to be executed by the facsimile apparatus of the embodiment.
Figure 8:
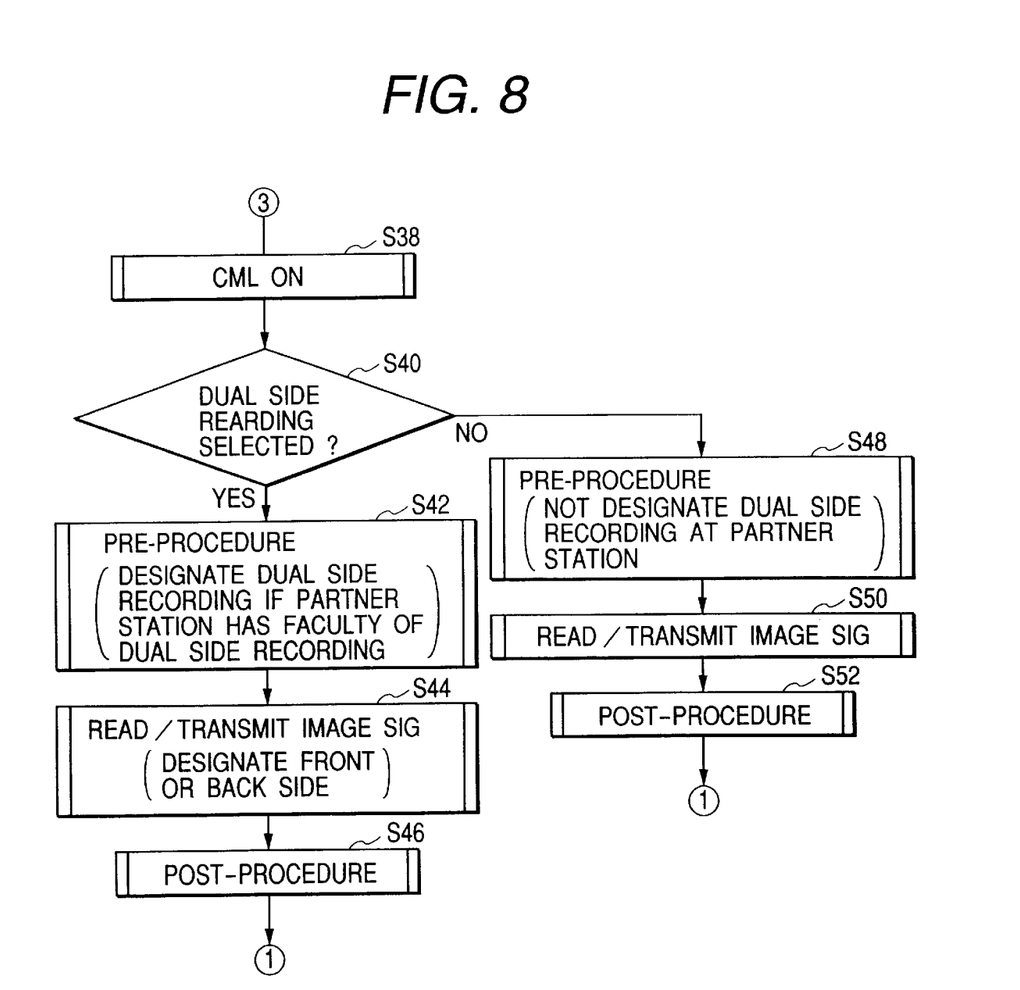
FIG. 8 is a flow chart illustrating the operation to be executed by the facsimile apparatus of the embodiment.

FIGS. 6 to 8 are flow charts illustrating a control to be executed by the control circuit 20 according to the embodiment of the invention. FIGS. 4A to 4D and FIGS. 5A to 5D illustrate examples of recorded data on the front and back sides of recording sheets according to the embodiment. The operation of this embodiment will be described with reference to FIGS. 4A to 8.

Referring to FIG. 6, the operation starts at S0. At S2 a clear pulse is output to the signal line 20h and no indication is given by the dual-side reading display circuit 24. At S4 a clear pulse is output to the signal line 20i and the indication "binding position is not designated" is given by the binding position display circuit 28.

At S6 the reading circuit 14 is given an instruction of reading the front side via the signal line 20f. At S8 the recording circuit 16 is given an instruction of recording read data on the front side via the signal line 20g.

At S10 a signal having the level "0" is output to the signal line 20a to turn off a CML. At S12 a signal having the level "0" is output to the signal line 20d not to transmit an ANSam signal.

At S14 it is checked whether a reception is selected, and at S16 it is checked whether a transmission is selected. If the reception is selected, the flow advances to S20, if the transmission is selected, the flow advances to S38, and if neither the reception nor the transmission is selected, the flow advances to S18.

At S20 a signal having the level "1" is output to the signal line 20a to turn on CML. At S22 a pre-procedure is executed wherein a presence of a dual-side recording function is notified to a partner apparatus.

At S24, based on the pre-procedure, it is judged whether the partner apparatus designates the dual-side recording. If it designates, the flow advances to S26, whereas if not, the flow advances to S30.

At S26 data is received and recorded. In this case, data to be recorded on the back side is not rotated. At S28 a post-procedure is executed to return to S6.

In FIGS. 4A to 5D, two circles at each side correspond to the binding positions of recording sheets recorded with data on the front and back sides. The binding positions at the longer side are shown in FIGS. 4A, 4B, 5A and 5B, and the binding positions at the shorter side are shown in FIGS. 4C, 4D, 5C and 5D. The latter case corresponds to S34 to be later described.

At S30 data on the signal line 28a is acquired to check whether the binding position is designated. If not designated, the flow advances to S26, whereas if designated, the flow advances to S32.

At S32 it is checked from the data on the signal line 28a whether binding at the longer side of recording sheets is designated. If the longer side of recording sheets is designated, the flow advances to S26, whereas if the shorter side of recording sheets is designated, the flow advances to S34.

At S34 data is received and recorded. Data to be recorded on the back side is rotated by 180°. At S36 a post-procedure is executed to return to S6.

At S38 a signal having the level "1" is output to the signal line 28a to turn on CML. At S40 data on the signal line 24a is acquired to check whether the dual-side reading is selected. If selected, the flow advances to S42, whereas if not, the flow advances to S48.

At S42 a pre-procedure is executed wherein if the partner apparatus has the dual-side recording function, the dual-side recording is designated. At S44 data is read and transmitted. At this time, a front side designation or a back side designation is given to the partner receiver. Thereafter, at S46 a post-procedure is executed to return to S6.

At S48 a pre-process is executed. At this time, a dual-side record designation is not given to the partner apparatus. Thereafter, at S52 a post-procedure is executed to return to S6.

The above-described operation by the control circuit is executed by a CPU in the control circuit in accordance with a program stored in a ROM or a RAM of the control circuit. Instead, the invention may be embodied by storing such a program in an external storage device such as a floppy disk, a hard disk, an optical disk, a CD-ROM and a memory card, reading the program with a dedicated reader, and executing the read program by CPU of the control circuit.

In the above embodiment, although the information processing apparatus of this invention is applied to a standalone type facsimile apparatus, the invention is not limited only thereto, but it is also applicable to other information processing apparatus provided in a sophisticated data processing system having composite functions of a copy function, an electronic file function, a data processing function and a communication function. The invention is also applicable to an information recording apparatus for recording various images and data without a communication function.

As described so far, according to the invention, even if recording sheets recorded with data on both sides thereof are bound at the longer side or shorter side, a user can easily discriminate recorded data. An apparatus which is very convenient can thus be provided.

Further, according to the invention, if the binding position is not designated, data to be recorded on the back side is not rotated relative to the data to be recorded on the front side. Therefore, by performing a usual dual-side recording operation, an output copy easy to be discriminated a user can be provided.

Still further, according to the invention, even if a dual-side original is selected for transmission, the dual-side recording of a dual-side original can be performed with high fidelity and an output copy reflecting the intention of the transmission side can be provided.

What is claimed is:

1. An information recording apparatus, comprising:

recording means capable of recording visible data on both sides of a recording sheet and recording the visible data after the visible data is rotated;

control means for controlling said recording means to record the visible data on a back side of the recording sheet by rotating the visible data by a predetermined angle relative to the visible data to be recorded on a front side of the recording sheet;

binding means for binding recording sheets recorded with the visible data;

designating means for designating a binding position of the recording sheets to be bound by said binding means;

data communication means for executing a data communication, wherein the visible data is externally received by the data communication; and facsimile communication means for executing a facsimile communication, wherein the visible data is externally received by the facsimile communication, wherein said control means changes the predetermined angle of the visible data to be recorded on the back side of the recording sheet in accordance with the binding position designated by said designating means, wherein if the binding position is at a longer side of the recording sheet, the visible data to be recorded on the back side is not rotated relative to the visible data to be recorded on the front side, and if the binding position is at a shorter side of the recording sheet, the visible data to be recorded on the back side is rotated by 180° relative to the visible data to be recorded on the front side, wherein if a dual-side original designation is not given from a transmission side, the visible data to be recorded on the back side of the recording sheet is rotated by 180° when the binding position is at a shorter side of the recording sheet, and wherein if the dual-side original designation is given from the transmission side, the visible data to be recorded on the back side is not rotated relative to the visible data to be recorded on the front side, when the binding position is at a shorter side of the recording sheet.

2. An information recording apparatus according to claim 1, wherein if the binding position is not designated, the visible data to be recorded on the back side is not rotated relative to the visible data to be recorded on the front side.

* * * * *